(12) United States Patent
Cottard et al.

(10) Patent No.: US 9,008,910 B2
(45) Date of Patent: Apr. 14, 2015

(54) ELECTRICAL POWER STEERING SYSTEM FOR A MOTOR VEHICLE

(75) Inventors: Philippe Cottard, Rueil-malmaison (FR); Didier Martinez, Saint-etienne-sous-bailleul (FR)

(73) Assignee: Renault S.A.S., Boulogne-billancourt (FR)

( * ) Notice: Subject to any disclaimer, the term of this patent is extended or adjusted under 35 U.S.C. 154(b) by 1220 days.

(21) Appl. No.: 12/301,160

(22) PCT Filed: May 4, 2007

(86) PCT No.: PCT/FR2007/051220
§ 371 (c)(1),
(2), (4) Date: Mar. 31, 2009

(87) PCT Pub. No.: WO2007/132109
PCT Pub. Date: Nov. 22, 2007

(65) Prior Publication Data
US 2009/0216407 A1    Aug. 27, 2009

(30) Foreign Application Priority Data
May 16, 2006    (FR) ...................................... 06 04349

(51) Int. Cl.
*B62D 6/00*    (2006.01)
*B62D 5/04*    (2006.01)

(52) U.S. Cl.
CPC ............ *B62D 5/0463* (2013.01); *B62D 5/0472* (2013.01)

(58) Field of Classification Search
CPC .... B62D 5/0457; B62D 5/046; B62D 5/0463; B62D 5/0466; B62D 5/0469; B62D 5/0472
USPC ........................................ 701/41, 42; 180/443
See application file for complete search history.

(56) References Cited

U.S. PATENT DOCUMENTS

| | | | |
|---|---|---|---|
| 5,719,766 A * | 2/1998 | Bolourchi et al. | ............... 701/42 |
| 6,134,490 A | 10/2000 | Ito et al. | |
| 2007/0198153 A1 | 8/2007 | Oya et al. | |

FOREIGN PATENT DOCUMENTS

| | | |
|---|---|---|
| DE | 199 19 374 | 11/1999 |
| FR | 2 814 423 | 3/2002 |
| WO | 2005 085041 | 9/2005 |

* cited by examiner

*Primary Examiner* — Jerrah Edwards
(74) *Attorney, Agent, or Firm* — Oblon, McClelland, Maier & Neustadt, L.L.P.

(57) ABSTRACT

An electrical power steering system for a motor vehicle. The system includes a rack actuator and a sensor for measuring torque applied to the steering wheel by the driver, the actuator and the sensor being arranged on the steering column, respectively between the steering wheel and the rack, and between the actuator and the steering wheel. The system develops a final assistance torque of the electrical power steering, which is adapted to simulate an identical localization of the rack actuator and the torque measuring sensor on the steering column, such that the Bode diagram phase representing the operation of the system is essentially nil at the two main frequencies of the mechanical resonance of the system.

11 Claims, 3 Drawing Sheets

Controller architecture

The first path of controller is dedicated for the
first mode control

Assistance gain and low pass filter
to control the first modal frequency

High pass filter to control the
second modal frequency

The second path of controller (phase advance)
is dedicated for the second mode control

ELECTRICAL POWER STEERING SYSTEM FOR A MOTOR VEHICLE

The present invention relates to a system and a method for electrical power-steering of a motor vehicle.

Conventionally, motor vehicles are provided with a chassis, a passenger compartment, and wheels connected to the chassis by a suspension mechanism, with steerable front wheels controlled by a steering wheel for use by the driver in the passenger compartment of the vehicle.

Between the steering wheel and the wheels, a steering column is provided, joined so as to rotate with the steering wheel, the lower end of which is provided with a pinion acting on a steering rack allowing the wheels to be turned about an approximately vertical axis so as to ensure their orientation and the rotation of the vehicle chassis.

Such steering mechanisms may be provided with electrical power-steering allowing the efforts of the driver to be reduced, in particular during maneuvers while stationary, for example a parking maneuver.

Mechanisms generally comprise a steering rack actuator located on the steering column between the steering wheel and the steering rack, and a sensor measuring the torque applied by the driver to the steering wheel, located on the steering column between the actuator and the steering wheel.

Document FR 2 814 423 relates to a method for determining the assist torque that has to be provided by an electric motor of a power-steering system. The assist torque is obtained by multiplying the driver torque by an assist gain depending on the driver torque and the vehicle speed.

Such systems do not take account of mechanical resonance problems of the system.

In fact, the coupling of electrical power steering with the front axle assembly of a vehicle constitutes an electromechanical system having two main mechanical resonances.

Each of these two main resonances is characterized by a frequency (resonant frequency), a damping (Q factor at resonance), and a modal deformation.

The modal deformation may be perceived as the image of the geometrical displacement of all the points vibrating in phase at the resonant frequency considered.

At these resonant frequencies the system stability is greatly reduced, which in practice causes oscillations of the system.

Systems exist which reduce the servo-gain in order to reduce the passband of the looped system in relation to the frequencies of these two main resonance modes. However, such a reduction in the gain of the looped system generates a noticeable performance low when one of these two main resonances is reached.

Other systems reduce the servo-gain locally, in terms of frequency, by filtering. Such systems markedly reduce the performance of the servo-regulation at the two main resonant frequencies.

Hence, one aim of the invention is to manage the control of these two main resonances without diminishing the performance of the electrical power-steering system when a mode of operation at one of these two main resonances is reached.

Thus, according to one aspect of the invention, an electrical power-steering system for a motor vehicle is proposed, comprising a steering-rack actuator and a sensor measuring the torque applied by the driver to the steering wheel, said actuator and sensor being located on the steering column between the steering wheel and the steering rack, and between the actuator and the steering wheel, respectively. The system comprises elaboration means for elaborating a final assist torque for the electrical power-steering designed to simulate an identical location of the steering-rack actuator and of the torque measurement sensor on the steering column, such that at the two main mechanical resonant frequencies of the system the phase of the Bode diagram representing the system operation is approximately zero.

Such filtering enables an approximately zero phase of the Bode diagram representing the system operation to be attained at resonant frequencies, and hence an identical location of the steering rack actuator and of the torque measurement sensor on the steering column to be simulated, and hence the oscillations of the system at these resonant frequencies to be avoided, without reducing system performance.

The final assist torque of the electrical power-steering is the torque transmitted to the steering column by the actuator.

According to one embodiment, the system comprises means for estimating a predetermined initial assist torque and a predetermined assist gain, depending on the measurement of the torque applied by the driver to the steering wheel.

For example, the predetermined initial assist torque is calculated by means of a predetermined mathematical function or an on-board cartography. The predetermined assist gain corresponds to the value of the slope of the initial assist torque, depending on the measurement of the torque applied by the driver to the steering wheel.

According to one embodiment, said elaboration means comprise first filtering means for filtering the initial assist torque as a function of the assist gain.

According to one embodiment, said elaboration means comprise second filtering means for filtering the measurement of the torque applied by the driver to the steering wheel.

According to one embodiment, said elaboration means comprise means for adding the output signals from the first and second filtering means, in order to deliver said final assist torque at the output of said elaboration means.

According to one embodiment, said actuator comprises an electric motor; said system furthermore comprises means for converting said final assist torque into a corresponding command for the current supplied to the electric motor.

According to one embodiment, said first filtering means of the low-pass type are suitable for applying a phase-delay of approximately $\pi/4$ radians to the first main mechanical resonant frequency of the system.

According to one embodiment, said second filtering means of the high-pass type are suitable for applying a phase-lead of approximately $\pi/4$ radians to the second main mechanical resonant frequency of the system.

According to another aspect of the invention, a method for managing electrical power-steering of a motor vehicle is also proposed, in which an assist torque of the electrical power-steering is developed that is suitable for simulating an identical location of a steering-rack actuator and of a torque measurement sensor positioned on the steering column, such that at the two main mechanical resonant frequencies of the system the phase of the Bode diagram representing the system operation is approximately zero.

Other aims, features and advantages of the invention will become apparent on reading the following description of several examples, which are in no way limiting, and provided with reference to the appended drawings, in which.

Figure 1:
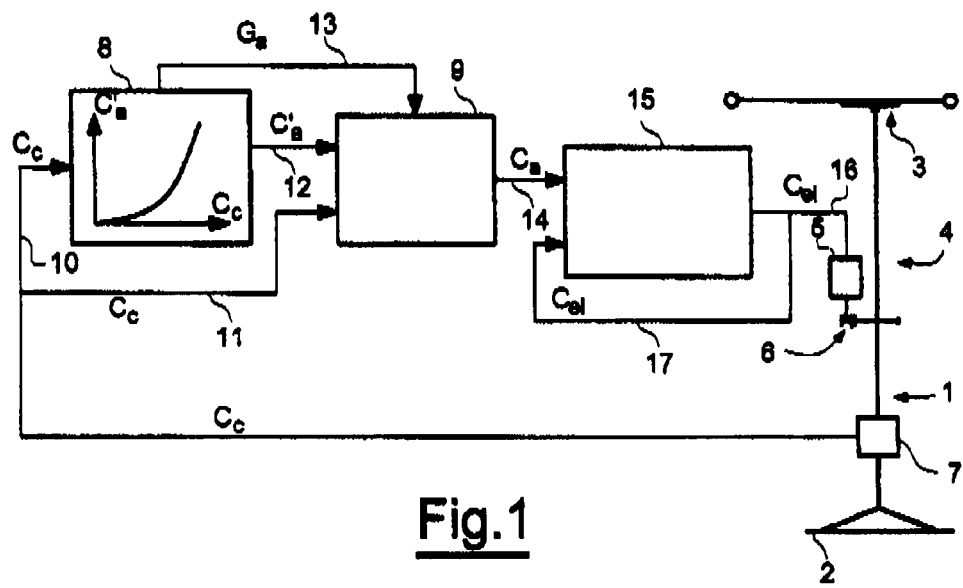
FIG. 1 illustrates an embodiment of a system according to an embodiment of the invention.

As illustrated in FIG. 1, an electrical power-steering system of a motor vehicle comprises a steering column, denoted 1 in a general manner and provided, at one end, with a rotationally joined steering wheel 2, which converts a rotational movement of the steering wheel into a translational movement of a steering-rack/pinion assembly, denoted 3 and known per se.

An actuator 4, comprising an electrical motor 5 generating an assist torque on the steering column 1 by means of a reduction gear 6, provides assistance in turning the steerable wheels of the vehicle.

A sensor 7, measuring the torque applied by the driver to the steering wheel 2, is positioned between the steering wheel 2 and the actuator 4.

A module 8 for estimating a predetermined initial assist torque $C'_A$ depending on the measurement of the torque $C_c$ applied by the driver to the steering wheel 2.

The torque measurement sensor 7 transmits the torque $C_c$ applied by the driver to the steering wheel 2 to the estimation module 8 and to an elaboration module 9, via connections 10 and 11, respectively.

The estimation module 8 delivers to the elaboration module 9 the predetermined initial assist torque $C'_a$ via a connection 12 on the one hand, and a predetermined assist gain $G_a$ via a connection 13 on the other hand.

The elaboration module 9 develops a final assist torque $C_a$ of the electrical power-steering, designed to simulate an identical location of the actuator 4 and of the torque measurement sensor 7. In other words, it is a matter of simulating an identical positioning on the steering column of the actuator 4 and of the torque measurement sensor 7.

The final assist torque $C_a$ is transmitted by the elaboration module 9, by means of a connection 14, to a conversion module 15 for converting the final assist torque $C_A$ into a corresponding command $C_{e1}$ for the current supplied to the electric motor 5 by means of a connection 16.

The conversion module 15 is equipped with a feedback loop 17 from the output to the input in order to transmit the command $C_{o1}$.

Figure 2:
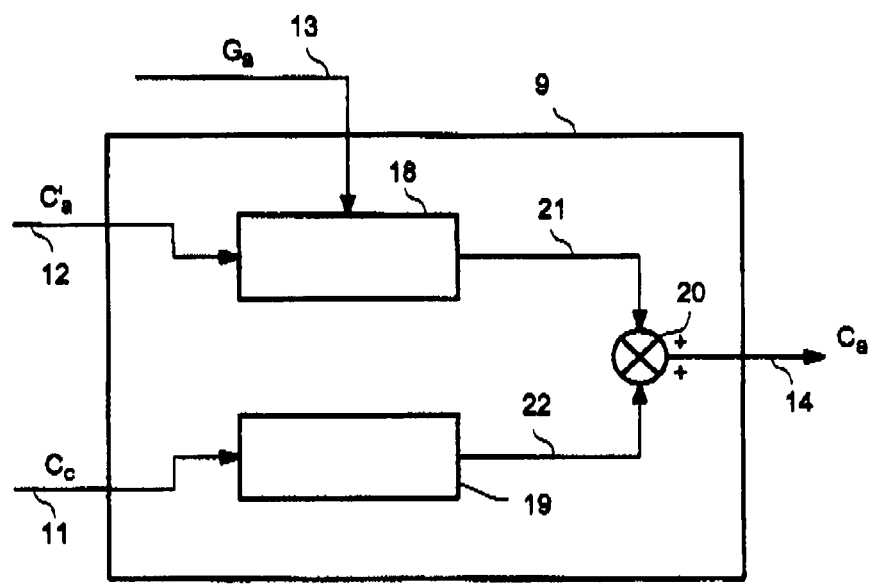
FIG. 2 illustrates a module for elaborating a final assist torque of the electrical power-steering according to an aspect of the invention.
Figure 3A:
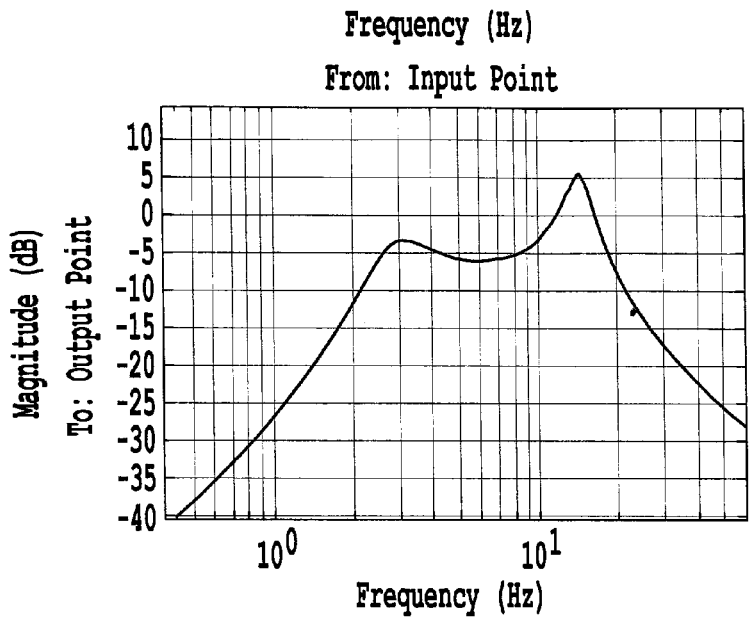
FIGS. 3A and 3B illustrate a bode magnitude diagram and a bode phase diagram, respectively, showing the frequency response between torque sensor end assistance torque of an embodiment of the invention.
Figure 3B:
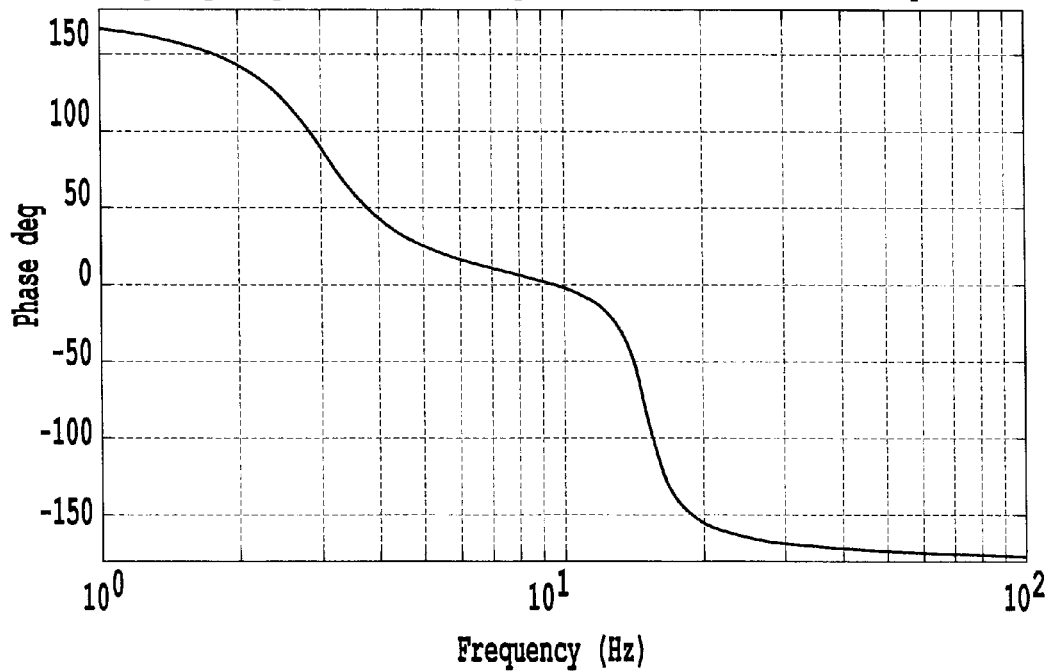
Figure 4:
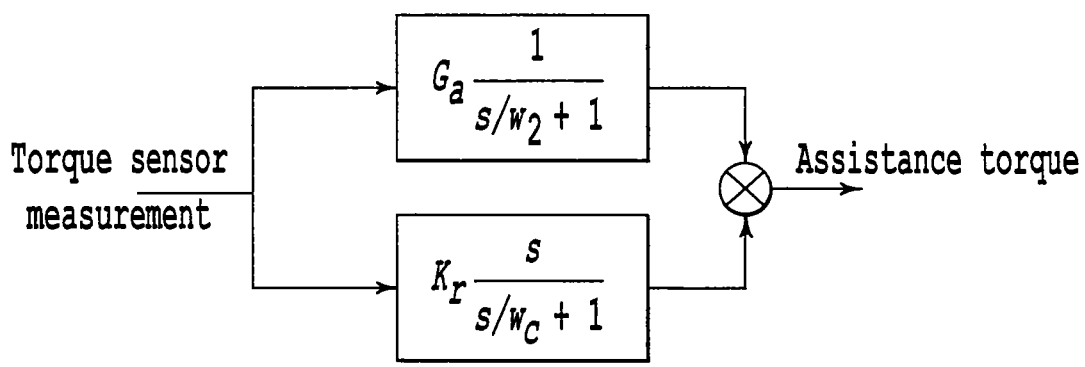
FIG. 4 illustrates a controller according to an embodiment of the invention.

FIG. 2 illustrates a more detailed embodiment of the elaboration module 9.

The elaboration module 9 comprises a first filtering module 18 of the low-pass type, a second filtering module 19 of the high-pass type, and an addition module 20.

The first filtering module 18 receives as input the initial assist torque $C'_a$ and the assist gain $G_A$, via the connections 12 and 13, respectively.

The second filtering module 19 receives as input the torque $C_c$ applied by the driver to the steering wheel and measured by the sensor 7, via the connection 11.

The addition module 20 receives as input the respective outputs of the first and second filtering modules 18 and 19, via connections 21 and 22.

The addition module 20 delivers as output from the elaboration module 9 the final assist torque $C_a$, via the connection 14.

In such a system two main mechanical resonant frequencies are observed.

The first resonant frequency is generated by the lateral stiffness of the front axle steering assembly, and the inertias of the steering wheel and the vehicle motor. The expression for its corresponding angular frequency $\omega_{1D,A,E}$ is the following:

$$\omega_{1D.A.E} = \sqrt{\frac{k_0 n_{rk}^2}{n_{gb}^2 J_{mot} + J_{sw}}}$$

in which:

$k_0$ represents the transverse stiffness of the front axle assembly in N/m;

$n_{rk}$ represents the steering rack ratio in m/rad;

$n_{gb}$ represents the reduction ratio, nondimensional;

$J_{mot}$ represents the inertia of the electric motor, in kg·m²; and $J_{SW}$ represents the inertia of the steering wheel, in kg·m².

It is a low-frequency resonance, generally between 3 Hz and 6 Hz. At such frequencies, the stiffness of the torque sensor 7 may be considered infinite.

The second resonance comes from the stiffness of the torque sensor 7 and the inertias of the steering wheel 2 and of the electric motor 5. The expression for the corresponding angular frequency $\omega_{2D,A,E}$ is the following:

$$\omega_{2D.A.E} = \sqrt{\frac{k_{sen} J_{mot} n_{gb}^2 J_{sw}}{J_{mot} n_{gb}^2 + J_{sw}}}$$

in which:

$k_{sen}$ represents the stiffness of the torque sensor, in Nm/rad.

This resonance corresponds to a high frequency, generally between 14 Hz and 20 Hz. The vibration is such that the inertia of the electric motor 5 is in phase opposition to the inertia of the steering wheel 2, and the stiffness of the torque sensor 7 is comprised between these two inertias.

Generally speaking, the main servo-control stability problem for a system having resonances caused by mechanical elements is the problem of identically locating the torque sensor 7 and the actuator 4.

In a system integrating a sensor and an actuator, these two elements are said to be identically located if the force applied by the actuator and the measurement carried out by the sensor act on the same inertia. This identical location ensures in-phase behavior by the mechanical system (no phase-shift between the input and the output) canceling out stability problems at the resonant frequencies.

For electrical power-steering, the principle of identical location of the actuator 4 and the sensor 7 is not complied with for reasons of cost and bulk.

The invention allows co-location to be simulated by filtering, so as to attain, at the resonant frequencies, a near-zero phase for the Bode diagram representing the operation of the system.

Electrical power-steering may be modeled by the following system of equations, in which the Laplace transform has been applied. (If f is a locally integrable function, defined over [0;+∞], the function $Lf(s) = \int_0^{+\infty} f(t) e^{-x1} \cdot dt$, with s=x+iy, is called the Laplace transform of f).

$$\begin{cases} J_{mot} s^2 \theta_{mot} = Kc \times i - \dfrac{k_{gb} q_{gb}}{n_{gb}} \\ \left(M_{rk} + \dfrac{J_{col}}{n_{rk}^2}\right) s^2 x_{rk} = \dfrac{k_{sen} q_{sen}}{n_{rk}} + Fy - k_0 x_{rk} \\ q_{sen} = \theta_{sw} - \dfrac{x_{rk}}{n_{rk}} \\ J_{SW} s^2 \theta_{SW} = -k_{sen} q_{sen} + C_c \\ q_{gb} = -\dfrac{x_{rk}}{n_{rk}} + \dfrac{\theta_{mot}}{n_{gb}} \\ Fy = \dfrac{k_{gb} q_{gb}}{n_{rk}} \end{cases}$$

in which:

$\theta_{mot}$ represents the motor angle, in rad;

Kc represents a motor torque constant, in Nm/A;

i represents the motor current, in A;

$k_{gb}$ represents the stiffness of the reduction gear, in Nm/rad;

$q_{gb}$ represents the relative displacement of the reduction gear, in rad;

$M_{rk}$ represents the mass of the steering rack, in kg;

$J_{col}$ represents the inertia of the steering column, in kg·m²;

$x_{rk}$ represents the displacement of the steering rack, in m;

$q_{sen}$ represents the relative displacement of the torque sensor, in rad;

Fy represents the assist force, in N;

$\theta_{SW}$ represents the angle of rotation of the steering wheel, in rad; and $C_c$ represents the torque applied by the driver to the steering wheel, in Nm.

The preceding equations enable determination of the transfer function $OL_{dec}$ for the transfer between the current supplying the electric motor 5 and the torque $C_c$ applied by the driver to the steering wheel 2:

$$OL_{dae} = -\frac{k_{sen}J_{sw}s^2 n_{gb}Kc}{n_{gb}^2 J_{mot}s^4 J_{sw} + (k_{sen}n_{gb}^2 J_{mot} + k_{sen}J_{sw} + n_{rk}^2 k_0 J_{sw})s^2 + n_{rk}^2 k_0 k_{sen}}$$

Taking account of the transfer function obtained, a filtering of the low-pass type is used, implemented by the first filtering module 18, at the first resonant frequency, allowing a phase-delay approximately equal to π/4 radians or 45° to be applied. The transfer function of the first filtering module 18 is the following;

$$\frac{G_a}{1 + s/\omega_{low-pass}}$$

in which the assist gain $G_a$ is that provided by the predetermined assist law for the estimation module 8.

Furthermore, the angular frequency $\omega_{low-pass}$ is defined by the following equation;

$$\omega_{low-pass} = \frac{\omega_{1DAE}}{2\xi}\sqrt{\frac{1}{1 + \frac{G_a J_{SW}}{J_{SW} + n_{gb}^2 J_{mot}}}}$$

in which:

ξ represents the reduced damping coefficient, nondimensional.

The damping of the first resonance with a predetermined damping coefficient ξ is guaranteed. The expression for the angular frequency $\omega_{low-pass}$ is determined by calculating the closed-loop transfer function between the assist torque and the driver torque then by developing the Taylor series for the latter in the region of the first resonant frequency. The damping condition provides the angular frequency $\omega_{low-pass}$ of the first low-pass filtering module 18.

It is explicitly given as a function of the physical parameters of the electric motor 5, the apparent stiffness of the front axle assembly, the steering-rack ratio, the desired damping and the assist gain $G_a$. It is therefore non-stationary as a function of the point of operation of the assist law, which point fixes the value of the assist gain $G_A$.

On the other hand, at the second, high-frequency resonant frequency, the second filtering module 19 effects a filtering of the high-pass type in order to apply a phase-advance approximately equal to π/4 radians or 45° to the second mechanical resonant frequency of the system.

The transfer function of the second filtering module 19 is the following:

$$\frac{s \times Kv}{1 + s/\omega_{high-pass}}$$

in which:

Kv represents the phase advance gain, in A/s.

The gain Kv and the angular frequency $\omega_{high-pass}$ are defined by the following expressions:

$$\begin{cases} Kv = \frac{2(1+\sqrt{3})\sqrt{3}}{3\sqrt{3+2\sqrt{3}}} \frac{n_{gb}}{\omega_{2DAE}} \\ \omega_{high-pass} = \sqrt{3}\sqrt{3+2\sqrt{3}}\,\omega_{2DAE} \end{cases}$$

In closed loop, the system damps the second resonance with a damping sector close to 1/√2. The gain Kv and the angular frequency $\omega_{high-pass}$ of the cut-off of the second filtering module 19, of the high-pass type, do not depend on the assist gain $G_a$, but only on physical parameters of the electrical power-steering.

Hence, the overall control strategy for the elaboration module 9 has the transfer function:

$$\frac{C_a}{C_c} = \left(\frac{Kv \times s}{(1 + s/\omega_{high-pass})} + \frac{G_a}{(1 + s/\omega_{low-pass})}\right)$$

The two filtering modules 18 and 19 employ first-order filterings which are simple to implement and therefore low in cost.

The invention claimed is:

1. An electrical power-steering system for a motor vehicle, comprising:
a steering-rack actuator and a sensor measuring torque applied by a driver to a steering wheel, the actuator and sensor being located on a steering column between the steering wheel and the steering rack, and between the actuator and the steering wheel respectively;
an elaboration unit configured to produce a final assist torque for electrical power-steering using a transfer function representative of an identical location of the steering-rack actuator and of the torque measurement sensor on the steering column, such that at two main mechanical resonant frequencies of the system the phase of a Bode diagram representing the system operation is approximately zero, the elaboration unit includes a first filtering unit configured to filter the initial assist torque as a function of the assist gain and a second filtering unit configured to filter a measurement of the torque applied by the driver to the steering wheel; and
an estimation unit configured to estimate a predetermined initial assist torque and a predetermined assist gain, depending on the measurement of the torque applied by the driver to the steering wheel.

2. The system as claimed in claim 1, wherein the elaboration unit includes an adding unit configured to add outputted signals from the first and second filtering units, to deliver the final assist torque at an output of the elaboration unit.

3. The system as claimed in claim 1, wherein the actuator includes an electric motor, and the system further includes a conversion unit configured to convert the final assist torque into a corresponding command for current supplied to the electric motor.

4. The system as claimed in claim 1, wherein the first filtering unit is of low-pass type and applies a phase-delay of approximately π/4 radians to the first main mechanical resonant frequency of the system.

5. The system as claimed in claim 1, wherein the second filtering unit is of high-pass type and applies a phase-lead of approximately π/4 radians to the second main mechanical resonant frequency of the system.

6. The system as claimed in claim 1, wherein the torque measurement sensor transmits the torque applied by the driver to the steering wheel directly to the elaboration unit and the estimation unit.

7. The system as claimed in claim 1, wherein the estimation unit transmits the predetermined initial assist torque to the elaboration unit via a first connection and the estimation unit transmitting the predetermined assist gain to the elaboration unit via a second connection.

8. The system as claimed in claim 7, wherein the first filtering unit receives as inputs the initial assist torque from the first connection and the predetermined assist gain from the second connection.

9. The system as claimed in claim 8, wherein the second filtering unit receives as an input the torque applied by the driver to the steering wheel and measured by the sensor.

10. The system as claimed in claim 1, further comprising a processor, the processor including said elaboration unit and said estimation unit.

11. A method for managing electrical power-steering of a motor vehicle, comprising:
developing, using a processor, a final assist torque of electrical power-steering using a transfer function representative of an identical location of a steering-rack actuator and of a torque measurement sensor positioned on a steering column, such that at two main mechanical resonant frequencies of the system the phase of a Bode diagram representing the system operation is approximately zero, by filtering an initial assist torque depending on assist gain and by filtering a measurement of the torque applied by the driver to the steering wheel; and
outputting, using the processor, the developed final assist torque to a conversion module to output a current command based on the developed final assist torque via circuitry to an electric motor controlling the electrical power-steering.

\* \* \* \* \*